Figure 1:
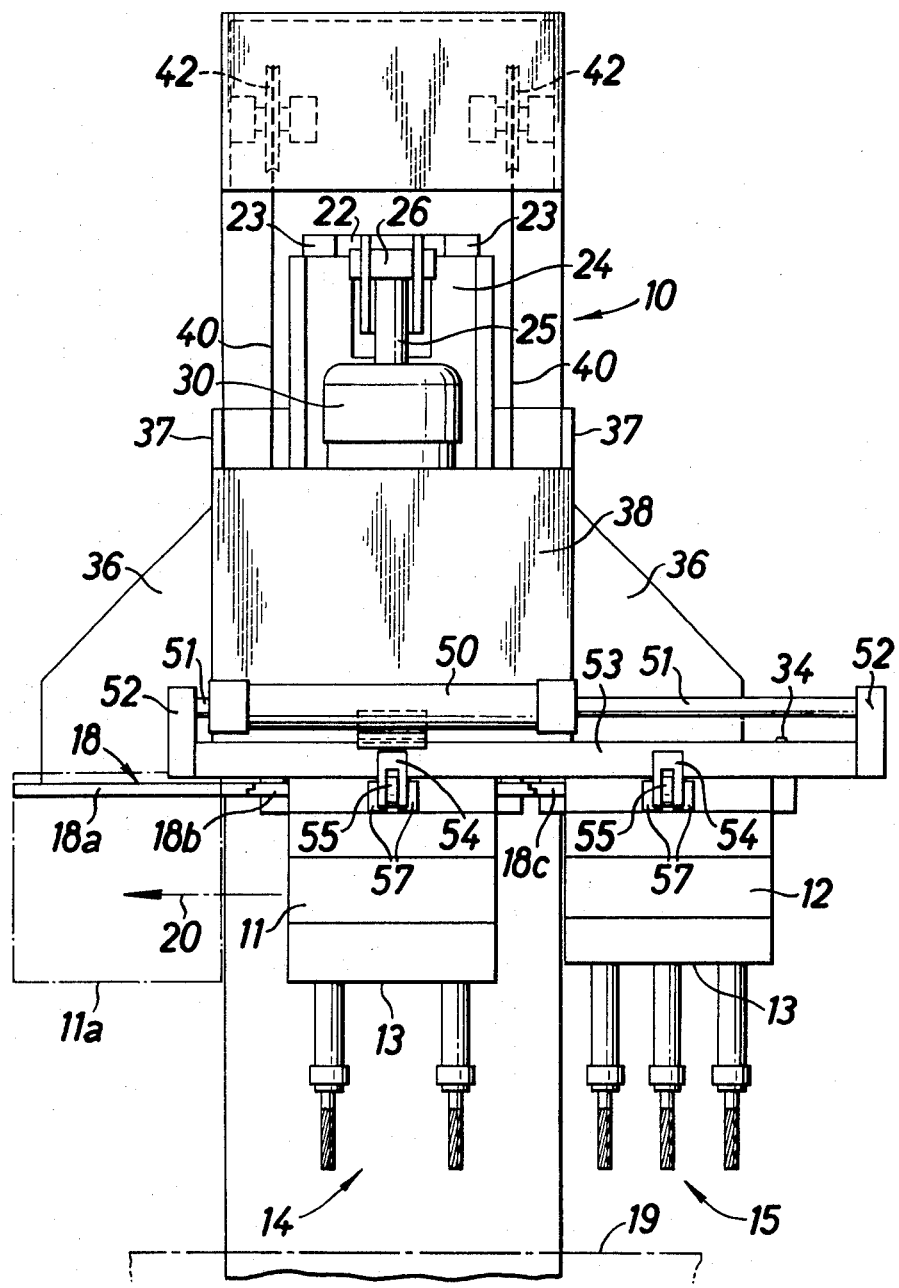

United States Patent [19]

Nohejl

[11] 3,858,286

[45] Jan. 7, 1975

[54] TOOL CARRYING HEAD FOR MACHINE TOOLS

[75] Inventor: Antonin Nohejl, Surbiton, Great Britain

[73] Assignee: The Mollart Engineering Company, Limited, Kingston By-Pass, Surbiton, Surrey, England

[22] Filed: Oct. 18, 1972

[21] Appl. No.: 298,653

[52] U.S. Cl. .................. 29/26 A, 29/568, 90/14, 408/53
[51] Int. Cl. ........................................ B23b 39/16
[58] Field of Search ............. 408/42, 53, 35; 90/14, 90/15; 29/568, 26 A

[56] References Cited
UNITED STATES PATENTS

| | | | |
|---|---|---|---|
| 1,477,851 | 12/1923 | Rott | 408/42 X |
| 3,286,595 | 11/1966 | Wollenhaupt | 29/26 A |
| 3,354,761 | 11/1967 | Sadier | 29/568 X |
| 3,509,619 | 5/1970 | Lipp | 29/568 |
| 3,555,963 | 1/1971 | Evans | 29/26 A |
| 3,650,018 | 3/1972 | Perry et al. | 29/568 |

FOREIGN PATENTS OR APPLICATIONS 1,803,989  6/1969  Germany .......................... 408/35

Primary Examiner—Andrew R. Juhasz
Assistant Examiner—F. R. Bilinsky
Attorney, Agent, or Firm—Clelle W. Upchurch

[57] ABSTRACT

A tool carrying head for a machine tool which comprises at least two interchangeable tool carrying units so that the tools can be changed or adjusted in one unit while the tools in the other unit are capable of carrying out a machining operation.

The tool carrying units are slidably mounted in a horizontal plane on spaced guide rails from an inoperative position to an operative position. In the operative position the chosen tool carrying unit is engageable by an actuating device and is movable by the device downwardly in a vertical plane into the machining position.

8 Claims, 5 Drawing Figures

TOOL CARRYING HEAD FOR MACHINE TOOLS

This invention relates to tool carrying heads for machine tools.

Such machines have the disadvantage that if it is required to change the component being machined, it is necessary to have the whole machine out of operation while the necessary changes are made to the tools. The object of the present invention is to provide a tool carrying head for a machine tool having at least two tool carrying locations so as to enable tools to be changed or adjusted in one of the locations while the tools in the other location are capable of carrying out a machining operation. Thus the machine can be set up for the next component to be machined while the machine is still in operation.

According to the present invention there is provided a machine tool having at least two tool carrying units each selectively movable in a substantially horizontal plane from a first inoperative position in which the tools may be removed therefrom or placed therein, to a second operative position in which the chosen one of said units is engageable by an actuating device for moving said chosen unit downwardly in a vertical plane from its operative position into a machining position.

In the preferred embodiment of the invention the tool carrying units are slidably mounted on spaced guide rails extending across the machine in a substantially horizontal plane. The guide rails extend to each side of the operative position so as to provide an inoperative position at each side thereof.

Preferably the tool carrying units are interconnected for simultaneous movement by a common actuating device.

In the preferred form of the invention the guide rails are formed in three sections with the outer sections at each side of the operative position rigidly fixed in relation to the structure of the machine. The central sections of the guide rails extending across the operative position are movable downwardly with the chosen unit into the machining position and are urged upwardly into the change-unit position by a counterweight or similar device.

Although in the preferred embodiment of the invention only two tool carrying units are provided it is of course within the scope of the invention to provide a machine haveing three, four or even more tool carrying units for movement through the operative position along extended guide rails.

The tool carrying heads in accordance with the present invention are primarily intended for use in single and double head machines, but can also be used with transfer machines or link line machines in which a number of work stations are provided, transfer means being provided to move the components from one station to the next until the components have passed successively through all work stations of the machine.

Such transfer machines may be in-line machines in which the work stations are spaced along a straight line or rotary transfer machines in which the stations are spaced about a center, the components being located on a work holding table which is rotatable about the center in a step-by-step fashion to bring components on the table into alignment with successive stations.

The tool carrying heads in accordance with the invention may also be used for link-line machines which comprise a series of separate machines which may be standard production machines or milling machines, machines which are positioned contiguously along a line, with transfer means, such as a conveyor, being provided to enbable components being machined to be transferred from one machine to the next.

Figure 2:
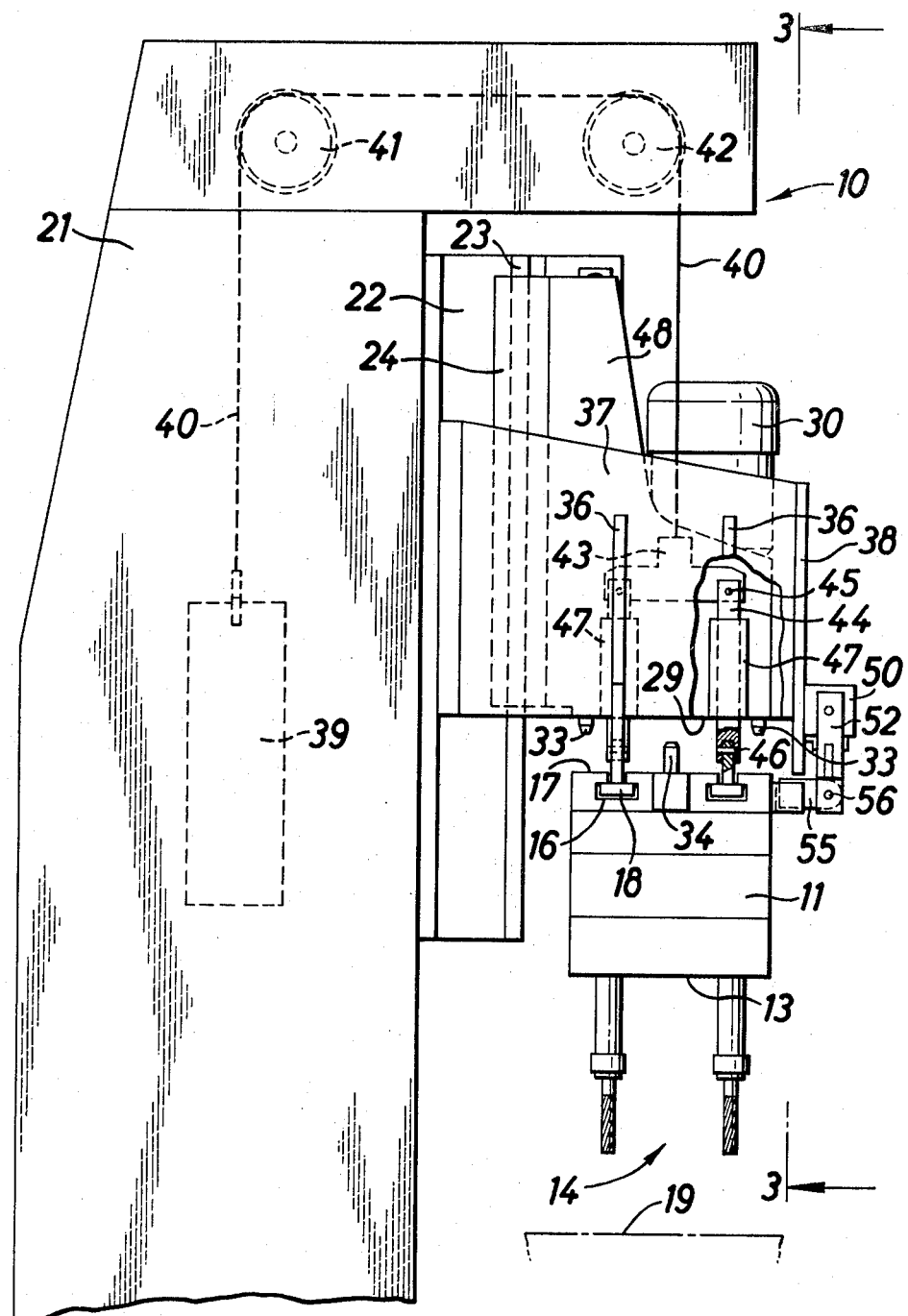
Figure 3:
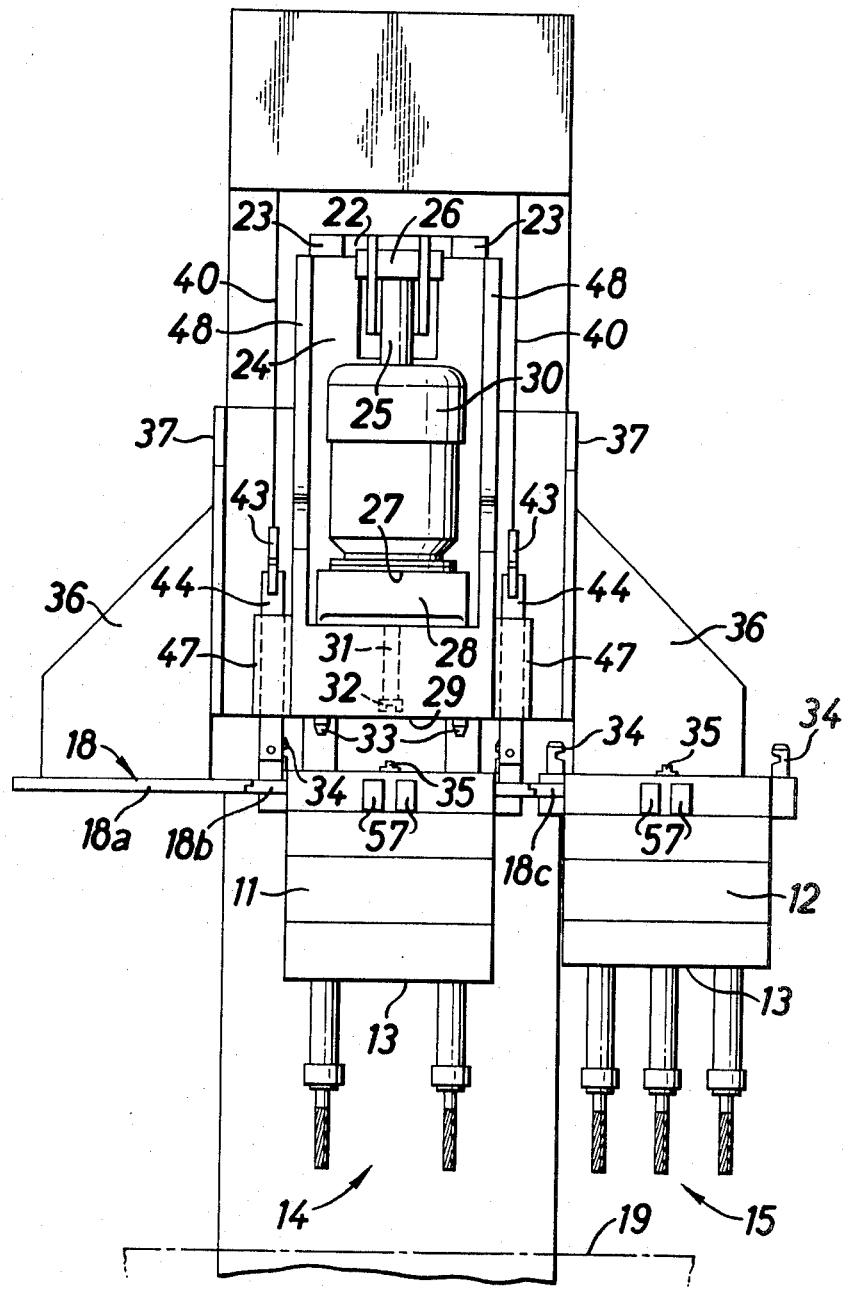
Figure 4:
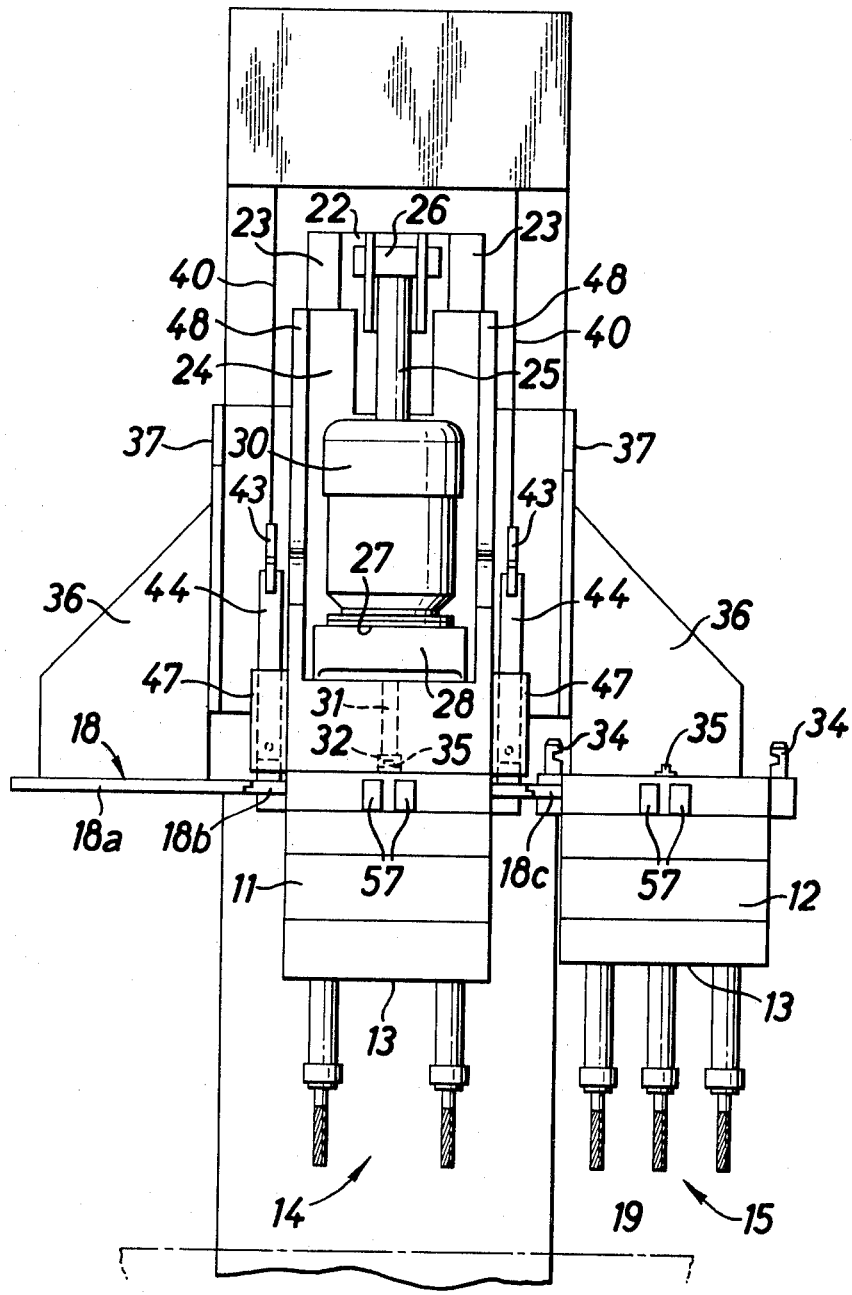
Figure 5:
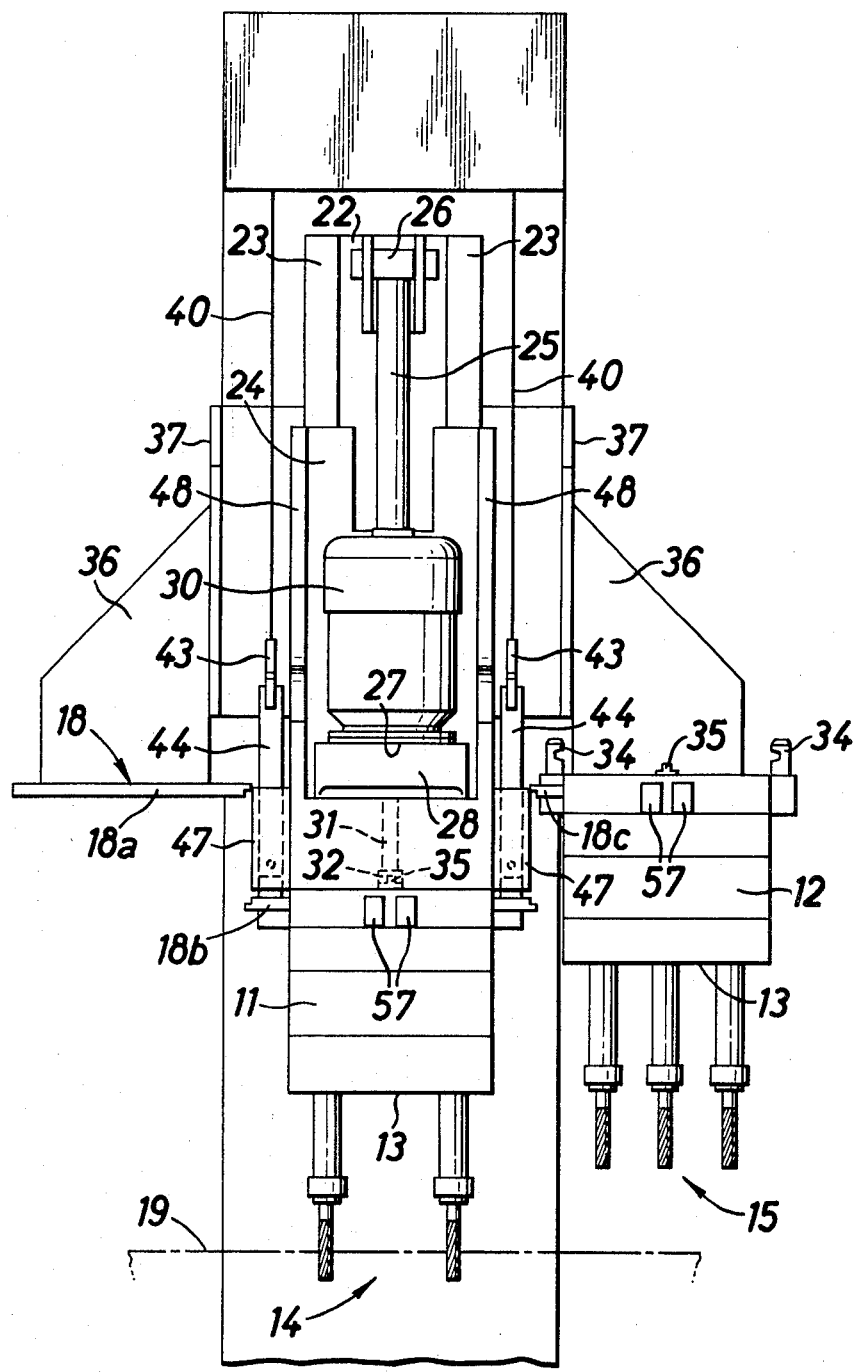

In the preferred embodiments of the invention the tools carried by the heads may be capable of forming one or more of the following operations: drilling, milling, boring, reaming, tapping, gun drilling, or grinding. The reference herein to the use of tools is intended to cover such tools capable of performing any such operations. The invention will now be described by way of example with reference to the accompanying drawings in which:

FIG. 1 is a front elevation of a machine in accordance with the invention, the parts being shown in a position in which the tool carrying units can be inter-changed, FIG. 2 is a side elevation of the machine taken from the left of FIG. 1 in which some of the parts have been broken away or shown in section, FIG. 3 is a front view of the machine similar to FIG. 1 but taken on the line 3—3 of FIG. 2, FIG. 4 is a front view similar to FIG. 3 but showing the actuating mechanism for the tool carrrying units in an intermediate position in engagement with the operative tool carrying unit, and FIG. 5 is a further front view similar to FIGS. 3 and 4 but showing the actuating mechanism in its lowermost position in which the tool carrying unit engaged thereby is in its machining position.

Referring now to the drawings, and in particular to FIGS. 1 and 2, the preferred embodiment of the invention consists of a machine or tool carrying head 10 having a pair of separate tool carrying units 11 and 12 which are of box-like construction having a rectangular cross section. The lower face 13 of each unit is adapted to receive suitable tools as indicated by the reference 14 in respect of unit 11 and the reference 15 in respect of the unit 12.

Each tool carrying unit 11 and 12 is formed with spaced transverse slots 16 across its upper surface 17 which enable the units to be slidably mounted on a pair of guide rails 18 which extend across the machine and which are preferably of inverted T-shape.

As will be hereinafter described, the units 11 and 12 are slidably supported on the rails 18 so that their position can be changed to bring one or the other of the units into an operative position for movement into its machining position. In FIG. 1 the tool carrying unit 12 is shown in an inoperative position in which the tools 15 carried thereby can be changed or replaced, or the complete unit removed from the rails, while the unit 11 is shown in an operative position in which it can be advanced downwardly to a machining position (as shown in FIG. 5) in which the tools 14 carried thereby engage a workpiece or component indicated diagrammatically by the reference 19. As will be hereinafter explained the unit 11 when in the position shown in FIG. 1 can be slidably moved along the rails 18 in a horizontal direction as indicated by the arrow 20 into an inoperative position shown to the left of the figure in chain lines by the reference 11a, while the unit 12 is simultaneously slidably moved into the operative position now vacated by the unit 11.

The various mechanisms for supporting the tool carrying units 11 and 12 and for moving the units both vertically and horizontally are all carried by a fixed structure 21. A vertically located base member 22 is rigidly mounted on the structure 21 and is formed with a slideway 23 for slidably receiving a vertically movable base structure 24. The movable base structure 24 is supported by a hydraulically operated double acting servo motor 25 by which it is also vertically movable downwardly along the slideway 23 as will be hereinafter described. The servo motor 25 comprises a piston-cylinder unit, the cylinder being fixedly mounted at its upper end on a support frame 26 secured to the base member 22 while the piston (not shown) is connected to the top surface 27 of a frame 28 mounted on the base structure 25 whereby actuation of the servo motor will move the base structure downwardly in a vertical direction to engage the lower surface 29 of the frame 28 with the upper surface 17 of the particular tool carrying unit in the operative position, which in the drawings is the unit 11. In FIGS. 1 to 3 of the drawings the base structure 24 is shown in its uppermost inoperative position in which it is separated from the tool carrying unit 11 in the operative position thus permitting the interchange of the units as will be hereinafter described along the guide rails 18. In FIG. 4 of the drawings the base structure 24 is shown in engagement with the tool carrying unit 11 after moving slidably down the slideway 23 on the fixed base structure 22 under the control of the servo motor 25.

The movable base structure 24 also carries a drive motor 30 which is intended for operating the tools of the operative unit to which it is to be connected. The motor 30 is preferably a reversible electric induction motor and the frame 28 of the structure 24 includes suitable gearing (not shown) and a plurality of output shafts one of which is shown at 31, each output shaft being provided at its outer end with a coupling member 32 which forms one part of a clutch unit (see FIG. 3).

The lower face 29 of the frame 28 carries a pair of locating pins 33 which are adapted to engage corresponding apertures (not shown) in the top surface 17 of the tool carrying unit as the frame 28 of the base structure 24 abuts the unit in its downward movement under the control of the servo motor 25 as shown in FIG. 4 of the drawings. The frame 28 furthermore includes hydraulically operated locking means adapted to engage slots in locking pins 34 carried by each of the tool carrying units. As the movable base structure 24 engages the top face 17 of the unit 11 under the operation of the servo motor 25, the coupling member 32 engages with a complementary coupling member 35 located on the top surface 17 of the unit 11. The coupling member 35 forms the input member for the tools 14 to which it is connected by suitable gearing (not shown).

The constructional details of the base structure 24 together with its operating servo motor 25 and drive motor 30 is similar to that described in our co-pending application Ser. No. 196,711 where the features are shown in greater detail more particularly in FIG. 4 of the drawings.

The guide rails 18 which slidably support the tool carrying units 11 and 12 are spaced apart as shown clearly in FIG. 2 of the drawings and they extend across the machine in a substantially horizontal plane. Each of the guide rails is formed in three entirely independent sections which are shown in the drawings by the references 18a, 18b and 18c. The outer sections 18a and 18c are fixedly mounted and as shown in FIG. 1 of the drawings are intended to support the tool carrying units 11 and 12 when they have been moved to an inoperative position. As shown the fixed outer sections 18a and 18c of the guide rails are attached to the lower edges of plates 36 which are in turn attached to the outer faces of side plates 37 secured to the fixed base member 22. As shown in FIG. 1 of the drawings the side plates 37 are connected along their front edges by a front plate 38 which is adapted for supporting the actuating mechanism for changing the position of the tool carrying units 11 and 12 as will be hereinafter described.

The fixed outer sections 18a and 18c of the guide rail are normally interconnected by the central section 18b as shown in FIGS. 1 and 3 of the drawings so as to provide a pair of continuous guide rails across the machine. As shown the central sections 18b of the guide rails have ends which abut and overlap the fixed end sections 18a and 18c so that the central sections 18b can move downwardly away from the fixed sections. The central sections 18b are held upwardly in engagement against the fixed sections 18a and 18c at each of their ends by means of a pair of counterweights 39. Each counterweight 39 is suspended by a cable 40 which passes over pulleys 41 and 42 mounted on the fixed structure 21, the cables being connected at their other ends each to a floating lever 43. Each lever 43 supports two rods 44 which are pivotally connected to it at 45, the lower ends of the rods being connected to the corresponding ends of the central rail sections 18b by a pinned joint 46. The connecting rods 44 are each slidably located in a sleeve 47, the sleeves being rigidly attached to the side plates 48 of the movable base structure 24 as shown more clearly in FIGS. 3 to 5 of the drawings.

The mechanism for changing the position of the tool carrying units 11 and 12 comprises a double acting hydraulic servo motor 50 which is mounted on the front plate 38 of the fixed structure 21. The piston rods 51 of the servo motor 50 are connected to end members 52 which support a transverse member 53. Member 53 has spaced lugs 54 attached to it, the lugs carrying inwardly extending members 55 (see FIG. 2) which are pivotally attached at 56 thereto. Under normal conditions the pivotally mounted members 55 extend inwardly to engage between a pair of spaced lugs 57 on the tool carrying units 11 and 12. The arrangement is such that operation of the servo motor 50 in one or other direction moves the member 53 transversely across the machine and by means of the members 55 carried by the lugs 54 will slidably move simultaneously the units 11 and 12 into their change-over positions.

The pivotal connection of the members 55 with the lugs 54 is provided so as to allow the release of a tool carrying unit when in its inoperative position on one of the fixed rail sections 18a and 18c. By pivotally moving the member 55 downwardly a unit can be completely removed from the space guide rails by sliding it outwardly therefrom.

The operation of the machine will now be described starting with the parts in the position as shown in FIGS. 1 to 3 of the drawings. In this position of the machine the tool carrying unit 11 is in the operative position and is located on the movable central sections 18b of the guide rails. Energization of the servo motor 25 moves the movable base structure 24 downwardly along the slideway 23 of the fixed base member 22 and this movement of the structure 24 continues until the lower face 29 of the frame 28 engages the upper surface 17 of the tool carrying unit 11. Engagement of the base structure 24 with the tool carrying unit 11 interengages the locating pins 33 and at the same time the locking members 34 are engaged to hold the base structure clamped in engagement with the unit 11. The position is shown in FIG. 4 of the drawings and in this position of the parts the clutch members 32 and 35 are also interengaged to couple the tools 14 with the drive motor 30. Further operation of the servo motor 25 now moves the combined structure comprising the base structure 24 and the unit 11 downwardly into its machining position and this movement carries with it the central section 18b of the guide rails which extend through the slots 16 in the upper surface 17 of the tool carrying unit 11. At the same time the unit 11 is disengaged from the members 55 carried by the lugs of the transverse operating servo motor 50 and to permit this the slots formed by the lugs 57 are open slots in the vertical direction. The arrangement of the parts in the machining position is shown in FIG. 5 of the drawings.

When the servo motor 25 has moved to its final machining position the drive motor 30 is energized to operate the machine tools 14.

In a reverse direction of movement the servo motor 25 moves the combined structure upwardly until the central sections 18b of the guide rails return to their normal position to provide the continuous rail surface across the machine. Subsequently the locking devices are automatically disengaged to allow the return movement of the base structure 24 and its drive motor 30 upwardly to their inoperative position clear of the tool carrying unit 11. In this inoperative position as shown in FIG. 1 of the drawings the tool carrying unit 11 is once again engaged by the member 55 carried by the operating member 53 connected to the servo motor 50 which can then be actuated to change over the tool carrying units and so bring the unit 12 into the operative position while simultaneously moving the unit 11 into the position shown in chain lines by the reference 11a in FIG. 1 of the drawings.

The provision of the counterweights 39 provide a common balance for the weight of the drive structure 24 and the operative tool carrying unit carried by the movable central sections 18b of the guide rails.

It will of course be understood that the various movements as described above for changing over the tool carrying units 11 and 12 and for moving the selected tool carrying unit to a machining position will be fully controlled automatically. The sequence of operation may be hydraulically or electrically controlled and suitable arrangements including preferred drive controls are described in greater detail in our prior Pat. application Ser. No. 196,711. In this earlier application the construction of the locking devices and clutch controls are also described in detail and reference should be made to this earlier application for details of these features which, in themselves, form no part of the present invention.

I claim:

1. A machine tool having at least two tool carrying units each unit having at least one machining tool thereon, said units being slidably mounted on a guide rail extending across the machine in a substantially horizontal plane, said units being each selectively movable along said guide rail from a first inoperative position in which tools may be removed therefrom or placed therein, to a second operative position in which the chosen one of said units is engagable by a first actuating device for moving said chosen unit downwardly in a vertical plane into a machining position, said actuating device having means for driving said at least one tool on said chosen unit for performing machining operations, wherein the guide rail is formed in three sections, the outer two sections being rigidly fixed in stationary relationship to the structure of the machine so as to provide an inoperative position at each side thereof for receiving one or the other of the tool carrying units, and the central section providing said operative position and being movable downwardly with the chosen unit into the machining position, said outer two sections remaining in their stationary relationship to the structure of the machine when the central section is moved downwardly with the chosen unit.

2. A machine tool as claimed in claim 1 wherein the tool carrying units are slidably mounted on a pair of spaced guide rails extending across the machine in a substantially horizontal plane.

3. A machine tool as claimed in claim 2 wherein the central sections of the guide rails are urged upwardly into the operative position by a counterweight.

4. A machine tool as claimed in claim 1 wherein the tool carrying units are interconnected for simultaneous movement by a second common actuating device.

5. A machine tool as claimed in claim 3 having a fixed base member and a movable base structure mounted thereon for vertical movement into engagement with the chosen tool carrying unit in the operative position and for subsequently moving said unit into the machining position.

6. A machine tool as claimed in claim 5 wherein the movement of the base structure is controlled by a servo motor, and said base structure includes a drive motor for operating the machine tools carried by the tool carrying unit when connected thereto.

7. A machine tool as claimed in claim 6 wherein the movable base structure is provided with guiding members for slidably receiving rods interconnecting the movable central sections of the guide rails with the counterweight.

8. A machine tool as claimed in claim 7 wherein the rods at a corresponding end of the movable sections of the guide rails are pivotally attached to a common floating lever connected to a corresponding counterweight.

* * * * *